United States Patent
Kurzynski et al.

(10) Patent No.: US 11,916,769 B2
(45) Date of Patent: Feb. 27, 2024

(54) ONBOARDING OF RETURN PATH DATA PROVIDERS FOR AUDIENCE MEASUREMENT

(71) Applicant: The Nielsen Company (US), LLC, New York, NY (US)

(72) Inventors: David J. Kurzynski, South Elgin, IL (US); Samantha M. Mowrer, San Francisco, CA (US); Michael Grotelueschen, Chicago, IL (US); Vince Tambellini, Palatine, IL (US); Demetrios Fassois, Chicago, IL (US); Jean Guerrettaz, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 182 days.

(21) Appl. No.: 16/863,159

(22) Filed: Apr. 30, 2020

(65) Prior Publication Data
US 2020/0328955 A1   Oct. 15, 2020

Related U.S. Application Data

(63) Continuation-in-part of application No. 16/230,663, filed on Dec. 21, 2018.
(Continued)

(51) Int. Cl.
*H04L 43/0829* (2022.01)
*H04N 21/258* (2011.01)
*G06N 20/00* (2019.01)

(52) U.S. Cl.
CPC ......... *H04L 43/0835* (2013.01); *G06N 20/00* (2019.01); *H04N 21/25883* (2013.01); *H04N 21/25891* (2013.01)

(58) Field of Classification Search
CPC .......... H04L 43/0835; H04N 21/25891; H04N 21/25883; G06N 20/00
See application file for complete search history.

(56) References Cited

U.S. PATENT DOCUMENTS

| | | | |
|---|---|---|---|
| 8,843,423 B2 * | 9/2014 | Chu | G06N 5/025 706/45 |
| 8,863,166 B2 | 10/2014 | Harsh et al. | |

(Continued)

FOREIGN PATENT DOCUMENTS

| | | |
|---|---|---|
| WO | 2018234548 | 12/2018 |
| WO | 2021041909 | 3/2021 |

OTHER PUBLICATIONS

Bontempi, "Machine Learning Strategies for Time Series Prediction," Machine Learning Summer School, Hammamet, 2013, 132 pages.

(Continued)

*Primary Examiner* — Abdullah Al Kawsar
*Assistant Examiner* — Tewodros E Mengistu

(57) ABSTRACT

Example methods and apparatus to onboard return path data providers for audience measurement are disclosed herein. Example apparatus disclosed herein to predict return path data quality include a classification engine to compute a first data set of model features from validation tuning data reported from media metering devices and a second data set of model features from return path data reported from return path data devices. The example apparatus also include a prediction engine to train a machine learning algorithm based on the first data set, apply the trained machine learning algorithm to the second data set to predict quality of the return path data reported from the return path data devices, and determine an onboarding status for a return path data
(Continued)

provider based on an aggregate predicted quality of the return path data reported from the return path data devices.

18 Claims, 4 Drawing Sheets

Related U.S. Application Data

(60) Provisional application No. 62/893,610, filed on Aug. 29, 2019, provisional application No. 62/681,515, filed on Jun. 6, 2018.

(56) References Cited

U.S. PATENT DOCUMENTS

| | | | |
|---|---|---|---|
| 8,893,165 | B2 | 11/2014 | Hadfield et al. |
| 9,390,112 | B1* | 7/2016 | Daly ................... G06N 5/02 |
| 9,578,361 | B2 | 2/2017 | Doe |
| 9,848,224 | B2* | 12/2017 | Sullivan .......... H04N 21/25883 |
| 10,409,789 | B2* | 9/2019 | Zoll .................. G06F 11/3452 |
| 2006/0075421 | A1 | 4/2006 | Roberts et al. |
| 2008/0300965 | A1* | 12/2008 | Doe .................. G06Q 30/0204 |
| | | | 705/7.33 |
| 2010/0043021 | A1 | 2/2010 | Torsiello et al. |
| 2011/0289524 | A1 | 11/2011 | Toner et al. |
| 2012/0110027 | A1 | 5/2012 | Falcon |
| 2012/0278828 | A1 | 11/2012 | Yazdani et al. |
| 2014/0379421 | A1* | 12/2014 | Shankar .......... H04N 21/25883 |
| | | | 705/7.29 |
| 2017/0006342 | A1* | 1/2017 | Nagaraja Rao .. H04N 21/25883 |
| 2018/0063596 | A1* | 3/2018 | Joglekar ............ G06Q 30/0251 |
| 2018/0097741 | A1* | 4/2018 | Gavade ............ H04N 21/47202 |
| 2018/0131996 | A1 | 5/2018 | Pecjak et al. |
| 2019/0158916 | A1 | 5/2019 | Shankar et al. |
| 2019/0200076 | A1 | 6/2019 | Sanchesshayda et al. |
| 2019/0378034 | A1 | 12/2019 | Mowrer et al. |

OTHER PUBLICATIONS

International Searching Authority, "Written Opinion," dated Dec. 4, 2020 in connection with International Patent Application No. PCT/US2020/048544, 5 pages.

International Searching Authority, "International Search Report," dated Dec. 4, 2020 in connection with International Patent Application No. PCT/US2020/048544, 3 pages.

International Searching Authority, "International Preliminary Report on Patentability," dated Mar. 1, 2022 in connection with International Patent Application No. PCT/US2020/048544, 6 pages.

United States Patent and Trademark Office, "Non-Final Office Action," dated Jan. 13, 2022 in connection with U.S. Appl. No. 16/230,663, 27 pages.

United States Patent and Trademark Office, "Final Office Action," dated Jul. 29, 2022 in connection with U.S. Appl. No. 16/230,663, 25 pages.

United States Patent and Trademark Office, "Final Office Action," dated Apr. 3, 2023 in connection with U.S. Appl. No. 16/230,663, 25 pages.

\* cited by examiner

ONBOARDING OF RETURN PATH DATA PROVIDERS FOR AUDIENCE MEASUREMENT

RELATED APPLICATIONS

This patent claims priority to U.S. Provisional Patent Application Ser. No. 62/893,610, filed on Aug. 29, 2019, and is a continuation-in-part of U.S. patent application Ser. No. 16/230,663, filed Dec. 21, 2018, which claims priority to U.S. Provisional Patent Application Ser. No. 62/681,515, filed on Jun. 6, 2018. U.S. Provisional Patent Application Ser. No. 62/893,610, U.S. patent application Ser. No. 16/230,663, and U.S. Provisional Patent Application Ser. No. 62/681,515 are hereby incorporated herein by reference in their entireties. Priority to U.S. Provisional Patent Application Ser. No. 62/893,610, U.S. patent application Ser. No. 16/230,663, and U.S. Provisional Patent Application Ser. No. 62/681,515 is hereby claimed.

FIELD OF THE DISCLOSURE

This disclosure relates generally to audience measurement and, more particularly, to onboarding of return path data providers for audience measurement.

BACKGROUND

Many households access media through set top boxes (STBs) provided by media providers (e.g., cable media providers, satellite media providers, etc.). Some STBs are equipped to report tuning data, which is indicative of the media accessed by the STBs, back to the media providers. Tuning data reported back to media providers via STBs is sometimes referred to as return path data (RPD). RPD tuning data may be used by audience measurement entities to monitor people's exposure to media.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
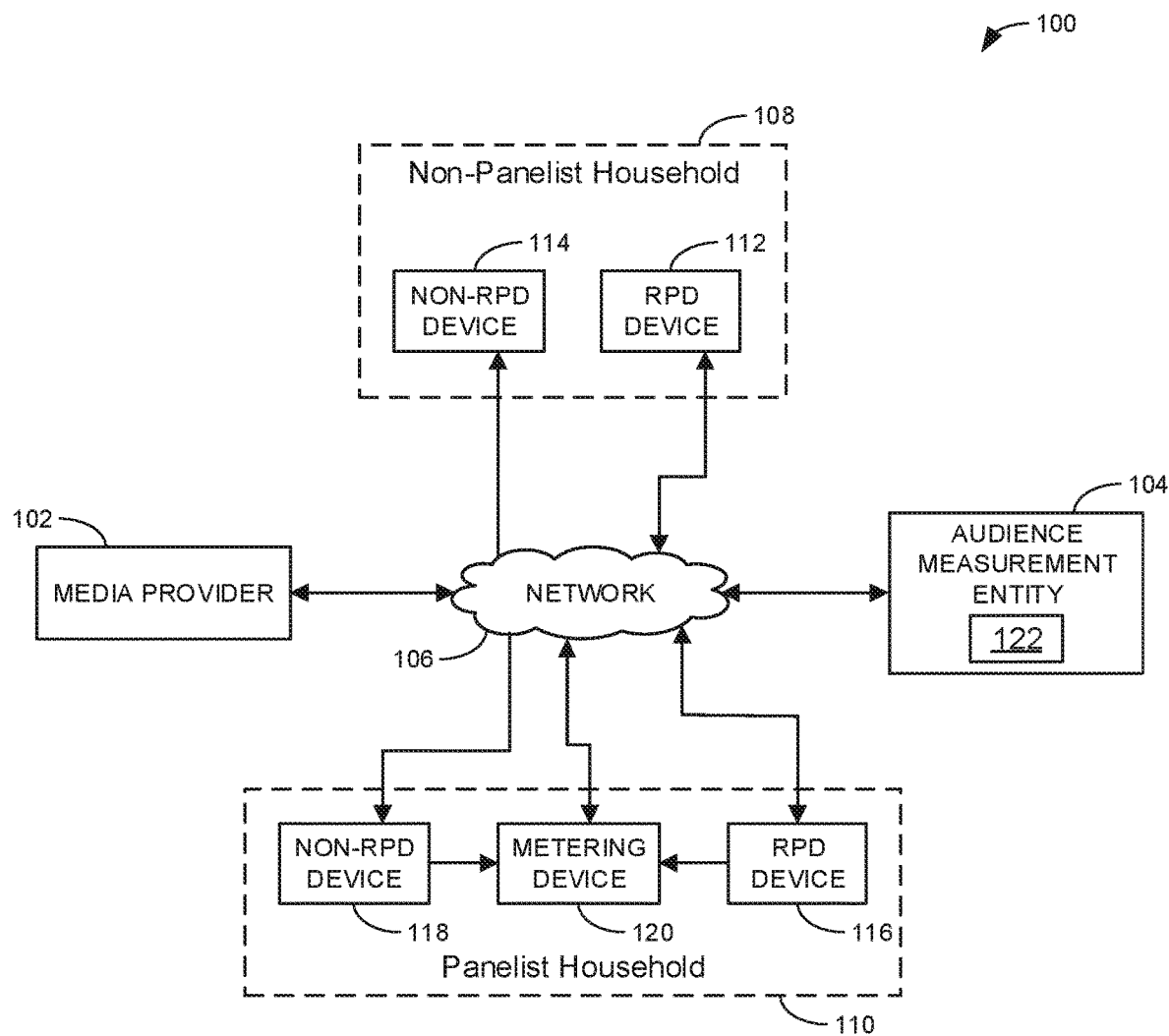
FIG. 1 is an example environment including an example RPD quality predictor to onboard return path data providers for audience measurement based on predicted return path data quality in accordance with teachings disclosed herein.

Typically, national ratings are generated based on audience measurement data collected via people meters installed in statistically selected panelist households. The people meters monitor the exposure of panelists to media and automatically report such data to an audience measurement entity (AME) for subsequent analysis and processing. Additionally or alternatively, some AMEs rely on panelists in smaller local market areas to record their media consumption behavior in paper diaries over specified periods of time and then mail the completed diaries to the AME for subsequent analysis and processing. While paper diaries provide a relatively inexpensive method to increase the audience measurement sample size, what panelists record in the paper diaries may not always be accurate, thereby introducing potential biases in the data. Furthermore, diary samples often favor highly rated broadcast stations while neglecting smaller broadcast or cable networks such that the collected panel data may not be fully representative for reliable analysis.

As technology has advanced, AMEs have turned to tuning data collected, measured, and/or reported from RPD devices as an alternate source of data that may be used to generate ratings for media and/or other audience measurement metrics. As used herein, an RPD device refers to any type of media device (e.g., a STB or other similar device) that is capable of accessing media from a media provider and reporting tuning data regarding the media accessed back to the media provider. Such tuning data is referred to herein as Set-Top Box data, RPD tuning data or simply RPD. Set-Top Box data includes all the data collected by the set-top box. STB data may include, for example, tuning events and/or commands received by the STB (e.g., power on, power off, change channel, change input source, start presenting media, pause the presentation of media, record a presentation of media, volume up/down, etc.). STB data may additionally or alternatively include commands sent to a content provider by the STB (e.g., switch input sources, record a media presentation, delete a recorded media presentation, the time/date a media presentation was started, the time a media presentation was completed, etc.), heartbeat signals, or the like. The Set-top box data may additionally or alternatively include a household identification (e.g. a household ID) and/or a STB identification (e.g. a STB ID). Return path data includes any data receivable at a content provider from the return path from a content consumer site. As such, return path data includes set-top box data. Return path data may additionally or alternatively include data from any other consumer device with network access capabilities (e.g., via a cellular network, the internet, other public or private networks, etc.). For example, return path data may include any or all of linear real time data from an STB, guide user data from a guide server, click stream data, key stream data (e.g., any click on the remote—volume, mute, etc.), interactive activity (such as Video On Demand) and any other data (e.g., data from middleware). RPD data can additionally or alternatively be from the network (e.g., via Switched Digital software) and/or any cloud-based data (such as a remote server DVR) from the cloud.

Using RPD tuning data for audience metrics has the advantage that it is relatively inexpensive to obtain. For example, RPD tuning data may be obtained substantially automatically based on software installed on processors associated with the RPD devices reporting the RPD tuning data via any suitable network (e.g., the Internet). Not only is RPD tuning data relatively inexpensive to collect with modern computer technology that makes the reporting of such RPD tuning data possible, RPD tuning data is also advantageous in that it may be collected from much larger quantities of households than possible through traditional audience measurement panels. For example, RPD tuning data may be collected from virtually every household that includes an RPD device because the reporting of RPD tuning data is often set as the default option for such devices at the time of manufacture.

While RPD tuning data provides advantages, there are challenges with relying exclusively, or even partially, on RPD tuning data for purposes of audience measurement. Even where a household has an RPD device to report tuning data (e.g., the household subscribes to a media content provider), the same household may have other media devices that are not capable of reporting RPD tuning data. Such devices are referred to herein as non-RPD devices. As a result, RPD tuning data collected in such households may not account for media exposure of audience members in non-RPD devices. Therefore, in some examples, RPD tuning data reported for a household may not account for all media exposure in the household and, thus, may be biased or illogical. Furthermore, the STBs that produce RPD are often not turned off reliably. As such, when a television is turned off, the STB may still be on and, thus, may report RPD during the time the television was turned off. Additionally, when some STBs undergo software updates, they provide RPD that indicates all stations as being active. Thus, while RPD can be collected for a wide array of people, it may be missing tuning data or providing tuning data that was never actually watched.

Examples disclosed herein mitigate problems associated with missing RPD by removing RPD homes and/or devices within homes with poor data quality from a measurement sample on a daily basis and/or at some other interval. Examples disclosed herein utilize supervised machine learning to determine the probability that a household and/or device has a high amount of missing data and, thus, should be excluded from the sample for a given time period (e.g., day) based on patterns in the RPD reported in household STB(s). Examples disclosed herein leverage common homes (e.g., validation tuning data), which are homes that are both in a panel recruited by an AME and are also RPD subscribers, to train the machine learning algorithm to accurately predict RPD homes with poor reported RPD quality.

In an example implementation, a set of features, or model variables, is created from each household's tuning data that is predictive of missing and/or low quality RPD. Next, a classifier is trained on validation tuning data, for which the missing data rate is known, in order to optimize model parameters. Then, the trained model is applied to RPD provider data, for which the missing rate is unknown, to predict the amount of missing RPD each RPD household is likely to have. Ultimately, this prediction is used to determine whether an RPD household should be excluded from the sample (e.g., exceeds the RPD missing rate threshold) because its predicted missing rate is too high, or whether the RPD household should remain in the sample (e.g., satisfies the RPD missing rate threshold). In some examples, the machine learning model is unique for each RPD provider and is refreshed monthly (and/or at some other refresh interval). For example, the machine learning model for a given RPD provider can be trained on some amount of past validation tuning data for that RPD provider. The trained model is then applied, during the current measurement period, to RPD for that RPD provider on a daily basis (and/or some other interval) to identify which RPD households for that RPD provider should be excluded from the sample on a given day. Examples disclosed herein are used to predict homes with missing RPD on a daily basis (and/or some other interval). Thus, the homes identified as likely to have missing RPD and/or additional data quality challenges can change over time (e.g., daily and/or at some other interval).

In some examples, model features that are available in both the validation tuning data and overall RPD provider data can be used to predict RPD quality in accordance with teachings of this disclosure. Features from daily household-level tuning and day statistics that are indicative of data quality are selected. Day statistics contain information about the quality of tuning data as it goes through an edit rules process (e.g., a data cleansing process), and they can be used to determine if the tuning data should remain in the sample. For example, model features include, but are not limited to, percentages of each household's tuning by STB model and by event type (Live, DVR playback, VOD etc.); gap minutes (e.g., minutes unaccounted for in a tuning session between on and off events), number of bridged tuning sessions (e.g., the number of tuning sessions to which bridging gaps were applied), percentages of conflicted tuning minutes (e.g., 2+ events viewed simultaneously on the same device with at least 30 seconds of overlap), overloaded tuning minutes (e.g., 66+ seconds of overlapping tuning occurring in the same minute), underloaded tuning minutes (e.g., less than 55 seconds accounted for in the data for that minute), fragmented tuning minutes (e.g., no events of greater than 30 seconds in the data for that minute), mixed tuning minutes (e.g., more than one non-gap event class, illustrated below in table 1, in the same minute), and unidentified tuning (UIT) minutes; and the difference in gap minutes before versus after bridging rules are applied (as a percentage of the total household's minutes that day).

In some examples, for both the common homes data on which the model is trained and the RPD provider data to which the model is applied, the set of model features listed in Table 1 is present for each household on each day.

TABLE 1

| event_name | event_type | event_class |
|---|---|---|
| Tune | * | 1 |
| TimerTune | * | 1 |
| DvrEvent | DVR_PLAY | 2 |
| DvrVodEvent | DVR_PLAY | 2 |
| PowerState | powerOff | 3 |
| PowerState | inStandby | 3 |
| ALL_OTHERS | ALL_OTHERS | 4 |

As used herein, "common homes" (e.g., validation tuning data) are homes that are both in a panel (e.g., a group of households recruited by an AME for audience measurement) and are also RPD subscribers. Examples disclosed herein link tuning data received from RPD providers on RPD-enabled devices and tuning data reported by corresponding panelist meters in common homes to make side-by-side, minute-by-minute comparisons of the tuning data each source reports. This process provides a truth source for evaluating RPD data quality and building models. As used herein, "missing data rate" (e.g., missing rate) refers to a percentage of missing panelist metering data not included in the corresponding reported RPD data for that panelist. For example, a panelist meter may return a total number of minutes for media that was monitored for a household, and an RPD device may return a total number of RPD tuning data minutes for that same household. As such, the RPD tuning data (e.g., the minutes of the RPD tuning data) are compared to the minutes reported by the panelist meter to determine the missing rate (e.g., the percentage of panelist metering data that is missing from the RPD data). For the pattern recognition process, examples disclosed herein train the machine learning model for each RPD provider using validation tuning data where the missing rate is known. In some examples, the model is a random forest classifier that predicts the probability that a household has a high amount or low amount of missing data for a given day. In some examples, the cutoff for what constitutes a high versus low missing rate is determined on a per provider basis, as each provider has varying degrees and predictors of data quality. In some examples, the final determination of whether a home should be included in the sample or excluded from the sample for a given day is based on whether the home's probability of missing data, as predicted by the machine learning model, exceeds a provider-specific probability threshold cutoff. In some examples, if the model predicts that a household has a high amount of missing data (based on a missing rate cutoff) with high confidence (based on a probability threshold cutoff), the household and its associated RPD will be excluded from the sample for a given day.

In some examples, the model is trained on 28 days of validation tuning data from a prior measurement period relative to the measurement period to which the model will be applied. The validation tuning data is split into a training sample (e.g., 70% of the data) and a holdout test sample (e.g., 30% of the data). Then, the model parameters are optimized on the 70% training sample using k-fold cross-validation. That is, within the 70% training sample, the data is again broken up into smaller, shuffled training and test samples (e.g., 5 variations of 80% training/20% test splits) to avoid overfitting while training the model. After cross-validation determines the optimal model parameters (e.g., for each model parameter determine the cross-validation errors for different versions of that parameter from the different training sets and select the parameter with lowest error as the optimal parameter), the trained model with the optimized model parameters is applied to the remaining 30% holdout test sample to produce model performance metrics, including accuracy (e.g., performance metrics are within 90%, performance metrics are within 95%, performance metrics are within 98%, etc.) ((True Positive+True Negative)/All Predictions), recall (True Positive/(True Positive+ False Negative)), precision (True Positive/(True Positive+ False Positive)), F1-score (2×Precision×Recall/(Precision+ Recall)), the model's probability distributions, the actual versus predicted missing rates, inclusion rates, average minutes per household per day, etc. Overall, the model is expected to have high precision, a low false positive rate, and medium recall to balance trade-offs between correctly identifying households with poor quality data versus excluding households with good data. The model can also be trained to have a lower missing rate, a lower inclusion rate, higher average tuning minutes among the homes kept in the sample, or to deal with additional data quality concerns such as rates of conflicted or misclassified tuning.

In some examples, the final model is applied daily to RPD provider homes in the current measurement period. Using the optimized model parameters from training, the model is applied to the daily household-level features of the RPD provider data to determine the probability that a given home is in a high or low missing RPD group. If the probability of missing data exceeds that provider's probability threshold, then the home is excluded from the sample for the given day. In addition to the final daily inclusion status for provider homes, model metrics can be produced including, but not limited to, the model's probability distributions, inclusion rates, and average minutes per household per day. The trained model may result in a lower inclusion rate but higher average tuning minutes among the provider homes that remain in the sample. In some examples, the final model is utilized to determine an onboarding decision for an RPD provider and/or RPD group. In some examples, the onboarding decision can be made after the final model is applied to the RPD provider homes. For example, after the final model is applied to the RPD provider homes, if an intab rate (Pre-PR Intab rate−Post-PR intab rate) and impact on average tuning minutes per household per day are within acceptable levels as compared to prior to applying the final model, then the RPD provider data can be used for onboarding to remove high missing homes data and to mitigate the negative effects of provider missing RPD data on audience measurement.

FIG. 1 is an example environment 100 including an example RPD quality predictor 122 to predict return path data quality for audience measurement in accordance with teachings of this disclosure. In the illustrated example, an example media provider 102 provides media to subscribers and collects RPD tuning data indicative of the subscribers accessing the media. The media provider 102 may provide the RPD tuning data to an example audience measurement entity (AME) 104 to enable the AME 104 to generate audience measurement metrics. In some examples, the media provider 102 and the AME 104 communicate via an example network 106 such as, for example, the Internet.

As shown in FIG. 1, the example environment 100 includes an example non-panelist household 108, and an example panelist household 110. The panelist household 110 represents households that have members that have enrolled as panelists with the AME 104, whereas non-panelist household 108 represents households that are not enlisted with the AME 104. There may be any number of panelist households 110 and non-panelist households 108 in the environment 100. In some examples, panelists correspond to a statistically selected subset of all potential audience members that is representative of a population of interest. In some such panel-based monitoring systems, the panelists agree to provide detailed demographic information about themselves. In this manner, detailed exposure metrics are generated based on collected media exposure data and associated user demographics, which can then be statistically extrapolated to an entire population of interest (e.g., a local market, a national market, a demographic segment, etc.).

In the illustrated example, the non-panelist household 108 includes an example RPD device 112 and an example non-RPD device 114. The panelist household 110 differs in that the panelist household 110 includes an example RPD device 116, an example non-RPD device 118, and an example meter 120. However, the non-panelist household 108 can include any number of RPD devices 112 and/or non-RPD devices 114. Likewise, the panelist household 110 can include any number of RPD devices 116 and/or non-RPD devices 118 and/or meters 120. As described above, an RPD device, as used herein, is any type of media device capable of accessing media from a media provider 102 and reporting RPD tuning data back to the media provider. By contrast, a non-RPD device, as used herein, refers to any type of media device that is capable of accessing and/or playing media from a media provider 102 but that does not have the capability to report RPD tuning data back to the media provider 102, or does not have such capabilities enabled.

In the illustrated example of FIG. 1, the non-panelist household 108 and the panelist household 110 include the RPD devices 112, 116 because the households are subscribers to the media provider 102. In some examples, the RPD devices 112, 116 are provided by the media provider 102 when the households initially become subscribers to enable access to media generated by media provider 102. As shown in the illustrated example, the RPD devices 112, 116 may access media from the media provider 102 and report RPD tuning data to the media provider 102 via the network 106.

As shown in the illustrated example, the households 108, 110 may include non-RPD devices 114, 118 in addition to the RPD devices 112, 116. However, a household may have any number of RPD devices and/or non-RPD devices, but does not have to have any RPD devices (i.e., capable of reporting RPD tuning data that is available to the AME 104) or non-RPD devices.

In the illustrated example, the RPD devices 112, 116 may be standalone devices (e.g., STBs, cable modems, embedded multimedia adapters (EMTAs)) that connect to separate media presentation devices, such as, television sets, radios, smartphones, tablets, computers, or any other device capable of playing the media accessed by the RPD devices 112, 116. In some examples, the RPD devices 112, 116 may be integrated with a corresponding media presentation device capable of playing the media accessed by the RPD device (e.g., a smart television). Similarly, the non-RPD devices 114, 118 may be integrated media presentations devices or standalone devices (e.g., STBs) that connect to separate media presentation devices.

As described herein, RPD devices are capable of reporting RPD tuning data to a media provider 102, but non-RPD devices do not. Thus, in the illustrated example, RPD tuning data collected by the media provider 102 would be limited to media accessed via the RPD devices 112, 116. Such data may be incomplete as it may not represent the complete exposure to media by all households and/or may be missing return path data. For example, the RPD tuning data would not indicate any media exposure by audience members using only non-RPD devices 114, 118 and/or may be missing return path data collected from the RPD devices 112, 116. Further, while the RPD tuning data would convey some media to which audience members in the households 108, 110 were exposed, any media accessed via the non-RPD devices 114, 118 is not accounted for in the reported RPD tuning data.

While the RPD tuning data collected from the RPD devices 112, 116 is insufficient to fully account for all media accessed in any of the households, the AME 104 is at least able to fully account for much, and possibly all, of media accessed at the panelist household 110. This is possible because the panelist household 110 is provided with the metering device 120 to track and/or monitor media played in the households 110 and report such to the AME 104 (e.g., via the network 106). In some examples, the metering device 120 also tracks and reports who is being exposed to the media being played so that the media exposure can be associated with particular individuals and their associated demographics previously collected when the household members enrolled as panelists. While a single metering device 120 is shown in the panelist household 110 to monitor both the RPD device 116 and the non-RPD device 118, in some examples, a separate metering device 120 may be associated with each device, or subset(s) of the devices, to independently track and report media accessed by each device to the AME 104.

In the illustrated example of FIG. 1, the AME 104 includes the example RPD quality predictor 122 to predict quality of return path data to be used for audience measurement (e.g., determine ratings data) as described more fully below. In the illustrated example, the RPD quality predictor 122 uses panel tuning data included in audience measurement data collected from panelist households (e.g., from the metering device 120 of the panelist household 110) to train a machine learning model to predict the quality of reported RPD from RPD devices 112, 116. In some examples, the RPD quality predictor 122 trains a random forest machine learning model with a 5-Fold Cross Validation to predict missing rates. In some examples, the RPD quality predictor 122 utilizes a neural network to predict missing rates for RPD data. In some examples, the RPD quality predictor 122 uses its trained machine learning model to predict whether RPD is complete and logical and identifies RPD tuning data predicted to be incomplete. In some examples, the RPD quality predictor 122 predicts which STBs are expected to report missing tuning data. For example, RPD received from the RPD device 112 may be missing multiple segments of RPD tuning data for a given viewing period. The RPD quality predictor 122 may predict the segments of RPD tuning data predicted by the RPD device 112 that will be missing and may remove those segments from further processing. In some examples, the RPD quality predictor 122 determines an onboarding decision. For example, the RPD quality predictor 122 may determine that RPD from a particular home and/or a particular RPD provider has metrics (e.g., intab rates, average tuning minutes, etc.) that do not satisfy an onboarding threshold. As such, the RPD quality predictor 122 may make a decision to remove RPD from further processing, and or identify RPD as satisfactory for onboarding.

Figure 2:
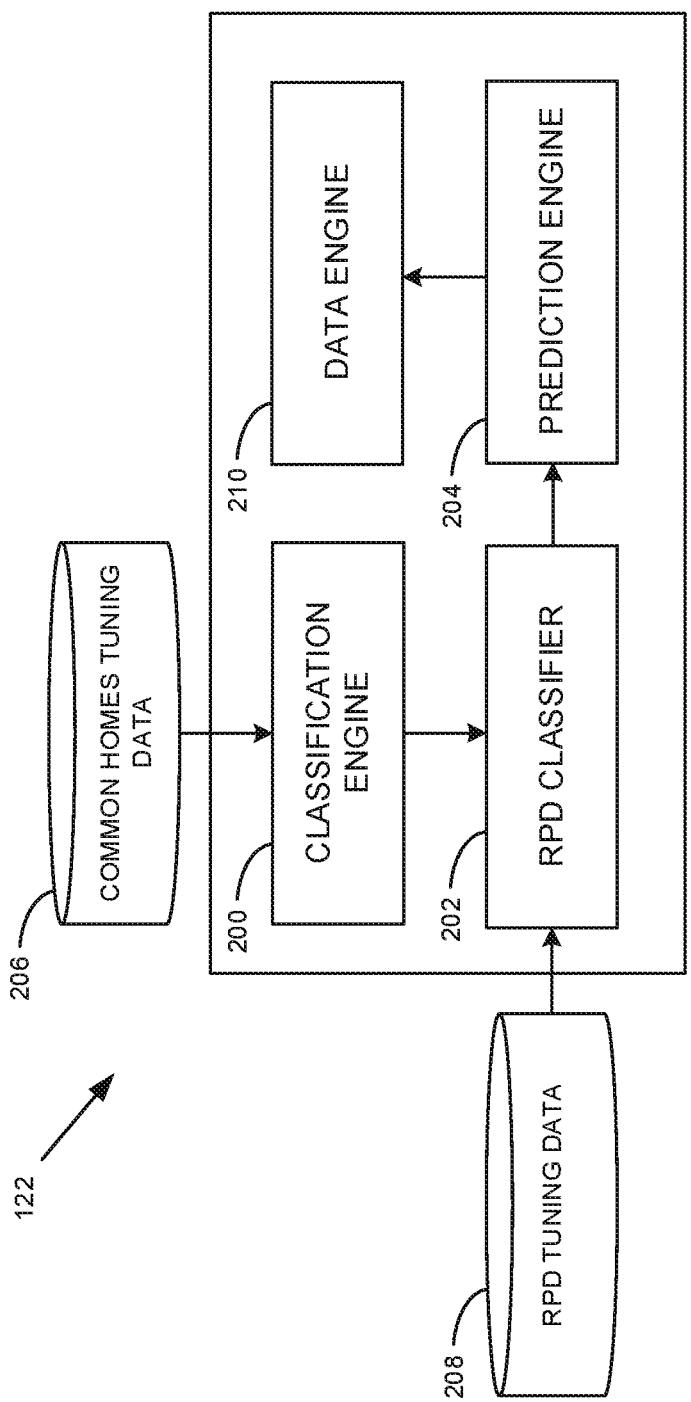
FIG. 2 is an example implementation of the example RPD quality predictor of FIG. 1.

FIG. 2 is an example implementation of the example RPD quality predictor 122 of FIG. 1. The example RPD quality predictor 122 includes an example classification engine 200, an example RPD classifier 202, an example prediction engine 204, an example common homes tuning data database 206, an example RPD tuning data database 208, and an example data engine 210. In some examples, the classification engine 200 is a means for classifying, or a classifying means. In some examples, the RPD classifier 202 is a means for classifying RPD, or an RPD classifying means. In some examples, the prediction engine 204 is a means for predicting, or a predicting means. In some examples, the data engine 210 is a means for analyzing, or an analyzing means.

In the illustrated example, the example classification engine 200 receives common homes tuning data (e.g., validation tuning data) from the common homes tuning data database 206 as an input. The example validation tuning data includes one month of live+7 (e.g. tuning minutes that correspond to viewing media within 7 days of the media first being aired) minute-level People Meter and Set Meter tuning joined with RPD provider tuning for common homes, which are identified through a third-party data match. In some examples, the classification engine 200 can convert event-level people meter (PM) RPD tuning data to minute-level data, and a full outer join combines the data on household identifier (ID), device ID, designated market area (DMA) ID, and viewed start times. The validation tuning data is then filtered back to include only tuning from households and panel inclusion days when the home passed people meter (PM) rules (e.g., such as a rule specifying the household must be included in the sample during both the credited and viewed times for time shifted viewing (TSV)). Then, the example classification engine 200 filters the validation tuning data to include only tuning from active households and devices represented in the RPD tuning data. In some examples, the validation tuning data from the common homes tuning data database 206 is not filtered by RPD households and/or date because it is desirable to have the model train on a full range of data quality from the RPD providers. In some examples, input data stream (e.g., live only, live+sd, live+3, live+7) are configurable and are subject to change. As used herein, "live only" refers to tuning data for media that was viewed on the same day the media first aired and during the time period the media first aired; "live+sd" refers to tuning data for media that was viewed on the same day the media first aired (either live or playback); "live+3" refers to refers to tuning data for media that was viewed within three days of the media first being aired; and "live+7" refers to tuning data for media that was viewed within seven days of the media first being aired.

The example classification engine 200 computes the same model features for both the validation tuning data and the RPD provider homes, and the model is trained on and applied to the same set of features. If there is a feature in the common homes dataset that is not in the RPD provider dataset or vice versa, the classification engine 200 excludes that feature from the model or inputs values of zero wherever it is not available. In the illustrated example, the classification engine 200 computes features at a household per day level (aggregated across devices). For example, the classification engine 200 computes features for validation tuning data provided daily, with household-level features produced monthly. For RPD provider homes, the classification engine 200 computes features daily, with household features produced weekly or daily. The classification engine 200 receives PM tuning data from common homes and RPD tuning from common homes and RPD provider homes, along with RPD data statistics, RPD active statuses, and RPD inclusion statuses.

The classification engine 200 filters the data to remove validation tuning data and return path data that was not credited and viewed during a viewing period (e.g., a day, a week, a time-shifted viewing period, etc.). Filtering for the common homes includes the classification engine 200 filtering streaming data (e.g., live only, live+sd, live+3, live+7) for the common homes, and also filtering the tuning data to remove tuning data that is not associated with a viewing period of interest. Filtering for RPD provider homes includes the classification engine 200 filtering streaming data for the RPD provider homes, and also filtering the tuning data to remove tuning data that is not associated with a viewing period of interest. The classification engine 200 then determines a percentage of daily household-level tuning by event type for features such as live, playback, video on demand, etc. by aggregating tuning durations by the event types listed in Table 1 for each household per date.

The example classification engine 200 may also calculate a percentage of daily household-level tuning by STB model type. For example, for each STB model type per provider, the classification engine 200 may calculate the percent of the household's total tuning minutes that are tuned on each box. The classification engine 200 may calculate the percentage by aggregating tuning durations from Table 1 across devices for each household per date. The classification engine 200 may also calculate normalized STB day statistics aggregated at a daily household level. For example, the classification engine may determine: 1) difference in gap minutes pre-bridging vs. post-bridging as a percentage of the household's total tuning minutes (e.g., gap minutes pre-bridging–gap minutes post-bridging)/total HH tuning; 2) conflicted minutes–percent of household's total tuning minutes that are conflicted); 3) overloaded minutes–percent of household's total tuning minutes that are overloaded; 4) underloaded minutes–percent of household's total tuning minutes that are underloaded; 5) fragmented minutes–percent of household's total tuning minutes that are fragmented; 6) UIT minutes–percent of household's total tuning minutes that are UIT; 7) mixed minutes–percent of household's total tuning minutes that are mixed, etc. The numerator of these features is calculated by aggregating tuning durations from the STB day statistics table across devices for each household per date. The denominator of these features are calculated by aggregating tuning durations from the RPD tuning table across devices for each household per date.

The classification engine 200 may also calculate a percentage of daily household-level tuning that is illogical. The classification engine 200 may calculate the numerator and denominator of this feature by aggregating tuning durations from the RPD tuning table across devices for each household per date. In some examples, the classification engine 200 may determine a percentage of all minutes with PM tuning where RPD tuning was missing, in processed common home datasets (e.g., missing rate). The example missing rate calculation does not count minutes where there is RPD tuning and no PM tuning (e.g., the RPD should be off).

The RPD classifier 202 determines final values for the outputs of the classification engine 200. In some examples, the RPD classifier 202 operates in a similar manner as the classification engine 200. In some examples, the RPD classifier 202 sends RPD tuning data from the RPD tuning data database 208 to the classification engine 200 and/or processes the RPD tuning data from the RPD tuning data database 208 in a similar manner as described above in connection with the classification engine 200.

The prediction engine 204 of the illustrated example utilizes a supervised machine learning paradigm in which the validation tuning data is split into a training dataset (70%) and holdout test dataset (30%) and then the training dataset is further split into different permutations of training and test data using cross-validation (e.g., 5 folds, each with an 80% training/20% test split) to avoid overfitting the model. The holdout test dataset (30%) is not used to train the model; it is used to produce metrics for the trained model that is selected from cross-validating the training dataset (70%). The prediction engine 204 generates accuracy metrics (e.g., total accuracy, precision, false positive rate, recall, false negative rate), confusion matrices, missing rates, inclusion rates (e.g., the percentage of all active households that were included in the sample on a given day), and average tuning minutes per household per day (e.g., the total number of tuning minutes across all inclusion households on a given day, divided by the total number of inclusion households on that day). In some examples, the prediction engine 204 determines a probability threshold based on the above disclosed supervised learning paradigm. For example, the prediction engine 204 determines probability thresholds by applying limits (e.g., set for a given provider) on accuracy, precision, recall, false positive rate metrics, etc. As such, in some examples, the prediction engine 204 determines a probability threshold by ranking probability thresholds that are within the limits by their f1-score, with the highest ranked probability threshold selected as the probability threshold for subsequent processing. In some examples, the probability threshold is based on the missing rate per household per day.

In some examples, the prediction engine 204 utilizes the trained model determined from the common homes model training and applies it to the RPD provider data (e.g., RPD tuning data 208). The prediction engine 204 assigns a probability to each household on each day to indicate whether it is likely to have a low or high amount of missing RPD (e.g., determined based on one or more thresholds), which corresponds to the predicted quality of the RPD.

The probability of high or low missing RPD is used to make the final determination of the home's inclusion status for each day. For example, the prediction engine 204 may compare the assigned probability to a threshold (e.g., above 60%, above 70%, etc.) to determine the inclusion status (e.g., include in further processing, remove from further processing, etc.) of the household. The prediction engine 204 generates a daily list of households and their inclusion status. In some examples, the prediction engine 204 examines and monitors a number of metrics from the RPD quality predictor 122 output to ensure that the inclusion rate does not drop drastically in a particular market and that the average tuning minutes per household per day increases relative to keeping all active homes included in the sample, as well as relate to any prior inclusion process being employed. In some examples, the final output of the prediction engine 204 is fed into the next step of processing as an updated daily inclusion status for each household. In some examples, homes that are to be excluded from the sample as referenced by the prior inclusion process will remain excluded from the sample.

In some examples, the prediction engine 204 of the illustrated example determines an onboarding status (e.g., whether to keep or discard RPD from a particular provider during a particular audience measurement interval) for a return path data provider to determine if the return path data should be included in further processing. For example, the prediction engine 204 assigns a respective data quality probability to each return path data provider during a time interval (e.g., a day, a week, etc.) to indicate whether that particular return path data provider is likely to have a low or high amount of missing RPD (e.g., determined based on one or more thresholds), which corresponds to the predicted quality of the RPD. The assigned data quality probability is used to make a determination of a given return path data provider's onboarding status for the time interval. For example, the prediction engine 204 may compare the assigned probability to a threshold (e.g., above 60%, above 70%, etc.) to determine the onboarding status (e.g., include in further processing, remove from further processing, etc.) of the return path data provider. In the illustrated example, the prediction engine 204 generates and updates a data structure (e.g., a database, a data array, a list, a spreadsheet, etc.) identifying the return path data providers and their respective onboarding status. In some examples, the prediction engine 204 determines a data quality probability to each household that corresponds to a particular RPD provider. In some examples, the prediction engine 204 determines an aggregate predicted quality for RPD based on aggregating the probabilities associated with each household associated with the particular RPD provider. In some examples, the prediction engine 204 determines a data quality probability of 90%, which indicates that the RPD provider is expected to have a low amount of missing RPD. Thus, the prediction engine 204 retains the RPD for its subscribers (provided the other quality requirements are met as described above) for the current measurement interval, whereas a data quality probability less than 30% indicates that the RPD provider is expected to have a high amount of missing RPD and the prediction engine 204 discards the RPD for the current interval. In some examples, the prediction engine 204 examines and monitors a number of metrics from the RPD quality predictor 122 output to ensure that the onboarding status does not drop drastically in a particular market and that the average tuning minutes per household per day increases relative to keeping all active homes included in the sample, as well as relate to any prior onboarding process being employed. In some examples, the final onboarding decision and the final output of the prediction engine 204 is fed into the data engine 210.

In the illustrated example, the output of the prediction engine 204 is fed into the data engine 210. The data engine 210 further processes the tuning data that has been processed by the classification engine 200, the RPD classifier 202 and the prediction engine 204 to determine audience measurement metrics corresponding to the tuning data. In some examples, the data engine 210 utilizes the onboarding decision to retain or discard different RPD providers. The data engine 210 uses the onboarding status to discard low quality data, thereby conserving memory, reducing processing overhead, etc. The example processes performed by the classification engine 200, the RPD classifier 202, and the prediction engine 204 to remove missing and illogical data increase the efficiency of the data engine 210. For example, the processes performed by the classification engine 200, the RPD classifier 202, and the prediction engine 204 improve the operating efficiency of the data engine 210 by removing illogical data to avoid processing such illogical data. Such processes further increase the computational efficiency of the data engine 210 by removing illogical data that would require additional processing cycles to analyze. Further, removing illogical data from the tuning data reduces the storage requirements of an example central facility. As such, the processes performed by the classification engine 200, the RPD classifier 202, and the prediction engine 204 are directed to one or more improvement(s) in the functioning of a computer. In some examples, the classification engine 200, the RPD classifier 202, the prediction engine 210, and/or the data engine 210 may perform the above calculations at a device level. For example, the classification 200 may determine which devices in a particular household have a percentage of daily-device level tuning that is illogical. In some examples, household and device are interchangeable. For example, each calculation computed by the classification engine 200, the RPD classifier 202, the prediction engine 210, and/or the data engine 210 for a household can be computed for a device. In some examples, the classification engine 200, the RPD classifier 202, the prediction engine 210, and/or the data engine 210 can determine a percentage of devices within a household that can be used in further calculations (e.g., 33% of devices in a household, etc.) and/or a percentage of devices within a home that should be removed from further processing.

While example manners of implementing example environments in accordance with the teachings of this disclosure are illustrated in FIGS. 1-2, one or more of the elements, processes and/or devices illustrated in FIGS. 1-2 may be combined, divided, re-arranged, omitted, eliminated and/or implemented in any other way. Further, the example classification engine 200, the example RPD classifier 202, the example prediction engine 204, the data engine 210, and/or, more generally, the example RPD quality predictor 122 of FIGS. 1-2 may be implemented by hardware, software, firmware and/or any combination of hardware, software and/or firmware. Thus, for example, any of the example classification engine 200, the example RPD classifier 202, the example prediction engine 204, the data engine 210, and/or, more generally, the example RPD quality predictor 122 of FIGS. 1-2 could be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example classification engine 200, the example RPD classifier 202, the example prediction engine 204, the data engine 210, and/or, more generally, the example RPD quality predictor 122 of FIGS. 1-2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example RPD quality predictor 122 and/or the example environment 100 of FIGS. 1-2 may include one or more elements, processes and/or devices in addition to, or instead of, those illustrated in FIGS. 1-2, and/or may include more than one of any or all of the illustrated elements, processes and devices.

Figure 3:
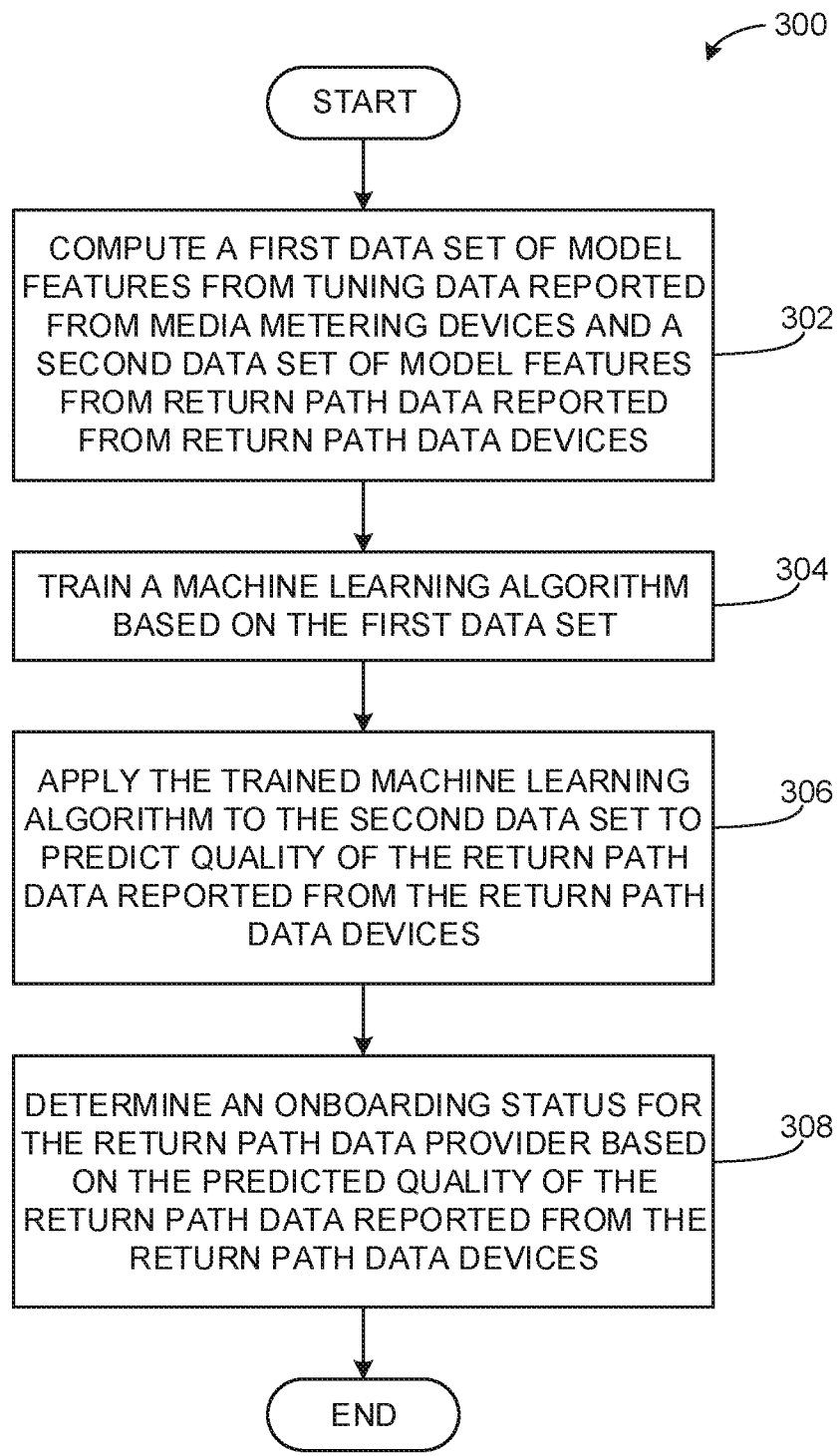
FIG. 3 is a flowchart representative of example machine readable instructions that may be executed to implement the RPD quality predictor of FIGS. 1 and/or 2 to onboard return path data providers for audience measurement based on predicted return path data quality in the example environment of FIG. 1.

A flowchart representative of example machine readable instructions for implementing the example classification engine 200, the example RPD classifier 202, the example prediction engine 204, the data engine 210, and/or, more generally, the example RPD quality predictor 122 of FIGS. 1-2 is shown in FIG. 3. In this example, the machine readable instructions comprise one or more programs for execution by a processor, such as the processor 412 shown in the example processor platform 400 discussed below in connection with FIG. 4. The one or more programs, or portion(s) thereof, may be embodied in software stored on a non-transitory computer readable storage medium such as a CD-ROM, a floppy disk, a hard drive, a digital versatile disk (DVD), a Blu-ray disk™, or a memory associated with the processor 412, but the entire program or programs and/or parts thereof could alternatively be executed by a device other than the processor 412 and/or embodied in firmware or dedicated hardware (e.g., implemented by an ASIC, a PLD, an FPLD, discrete logic, etc.). Further, although the example program(s) is(are) described with reference to the flowchart illustrated in FIG. 3, many other methods of implementing the example classification engine 200, the example RPD classifier 202, the example prediction engine 204, the data engine 210, and/or, more generally, the example RPD quality predictor 122 of FIGS. 1-2 may alternatively be used. For example, with reference to the flowchart illustrated in FIG. 3, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

An example program 300 that may be executed in the example environment 100 of FIG. 1 to leverage the RPD quality predictor 122 to onboard return path data providers based on predicted return path data quality is illustrated FIG. 3. In the illustrated example of FIG. 3, the classification engine 200 computes a first data set of model features from validation tuning data reported from media metering devices (also referred to as meters) monitoring common homes and a second data set of model features from return path data reported from return path data devices (block 302). For example, the classification engine 200 may receive tuning data from the common homes tuning data database 206 and compute a first data set for the common homes tuning data. In some examples, the tuning data from the common homes tuning data database 206 may be tuning data received from the metering device 120, and/or the RPD device 116 from the panelist household 110 of FIG. 1. As such, the classification engine 200 may compute the first data set of model features in a manner consistent with the examples described above in connection with FIG. 2. For example, the classification engine 200 may determine normalized STB statistics for a particular type of STB (e.g., the RPD device 116).

The classification engine 200 may also receive RPD tuning data from the RPD tuning data database 208 and compute a second data set for the RPD tuning data. In some examples, the RPD classifier 202 may receive the RPD tuning data and compute the second data set. For example, the RPD classifier 202 may receive the RPD tuning data from the RPD tuning data database 208, which may be RPD tuning data from the RPD device 112 of the non-panelist household 108 of FIG. 1. In some examples, the RPD classifier 202 may compute the second data set of model features in a manner consistent with the examples described above in connection with FIG. 2. For example, the RPD classifier 202 may determine that the STB of the RPD tuning data (e.g., RPD device 112) is a same model type as the STB providing the common homes tuning data (e.g., RPD device 116).

At block 304, the prediction engine 204 trains a machine learning algorithm based on the first data set, as described above in connection with FIG. 2. For example, the prediction engine 204 may split the first data set into a training dataset (70%) and holdout test dataset (30%). In some examples, the prediction engine 204 may further split the training dataset into different permutations (e.g., numTrees, maxDepth, etc.) of training data subsets and test data subsets using cross-validation (e.g., 5 folds, each with an 80% training/20% test split) to avoid overfitting the machine learning algorithm. In some examples, the prediction engine 204 trains the machine learning algorithm based on the training dataset and utilizes the holdout test dataset to determine an accuracy of the machine learning algorithm. In some examples, the prediction engine 204 generates accuracy metrics (e.g., total accuracy, precision, false positive rate, recall, false negative rate), confusion matrices, missing rates, inclusion rates, etc. for the machine learning algorithm based on the first dataset. For example, the resulting machine learning algorithm (e.g., machine learning model) is representative of accuracy metrics for a particular type of STB (e.g., RPD device 116).

At block 306, the prediction engine 204 applies the trained machine learning algorithm to the second data set to predict quality of the return path data reported from the return path data devices, as described above in connection with FIG. 2. For example, the prediction engine 204 utilizes the trained machine learning algorithm to determine a probability for the STB providing the RPD tuning data (e.g., RPD device 112) having a low or high amount of missing RPD, and compares the probabilities to a threshold to determine whether to include or exclude the RPD tuning data in subsequent processing operations. In the above example, the prediction engine 204 applies the trained machine learning algorithm to other RPD tuning data received from a STB (e.g., RPD device) that is of a same model type as the STB of the common homes tuning data (e.g., RPD device 116).

At block 308, the prediction engine 204 determines an onboarding status for the return path data provider based on the predicted quality of the return path data reported from the return path data devices. For example, the prediction engine 204 assigns a respective probability to each return path data provider during a time interval (e.g., a day, week, etc.) to indicate whether that particular return path data provider is likely to have a low or high amount of missing RPD (e.g., determined based on one or more thresholds), which corresponds to the predicted quality of the RPD. The assigned probability of high or low missing RPD is used to make the final determination of the return path data provider's onboarding status for the time interval. For example, the prediction engine 204 may compare the assigned probability to a threshold (e.g., above 60%, above 70%, etc.) to determine the onboarding status (e.g., include in further processing, remove from further processing, etc.) of the return path data provider. In some examples, the example program 300 ends when all identified RPD tuning data has been processed.

Figure 4:
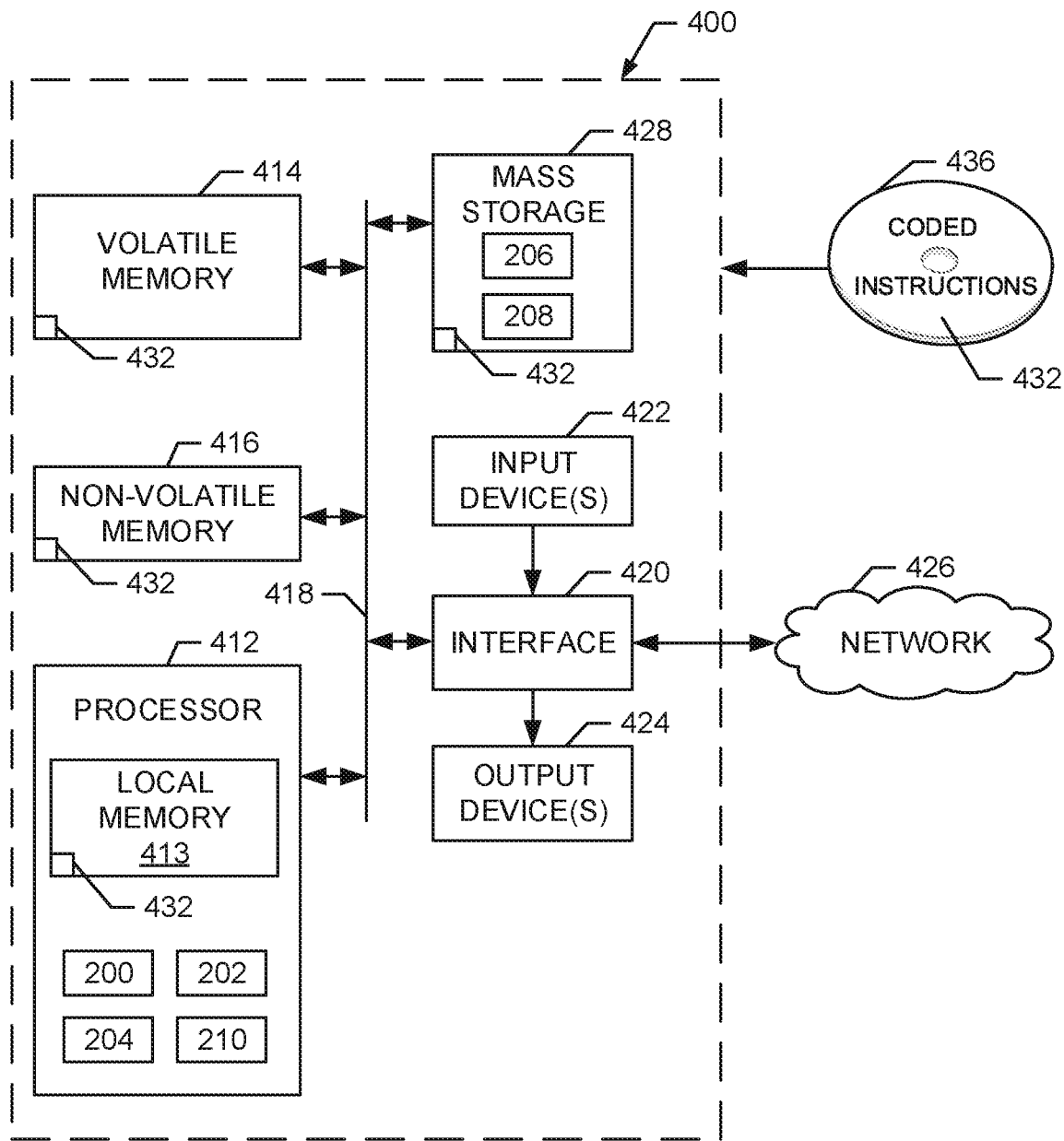
FIG. 4 is a block diagram of an example processor platform structured to execute the example machine readable instructions of FIG. 3 to implement the example RPD quality predictor of FIGS. 1 and 2.

FIG. 4 is a block diagram of an example processor platform 400 structured to execute the example instructions of FIG. 3 to implement the example RPD quality predictor 122. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. The hardware processor 412 may be a semiconductor based (e.g., silicon based) device. In this example, the processor 412 implements the example RPD quality predictor 122, the example classification engine 200, the example RPD classifier 202, the example prediction engine 204, and/or the example data engine 210.

The processor 412 of the illustrated example includes a local memory 413 (e.g., a cache). The processor 412 of the illustrated example is in communication with a main memory including a volatile memory 414 and a non-volatile memory 416 via a link 418. The link 418 may be implemented by a bus, one or more point-to-point connections, etc., or a combination thereof. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 400, can allow the user to control the computer system and provide data to the computer using physical gestures, such as, but not limited to, hand or body movements, facial expressions, and face recognition.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID (redundant array of independent disks) systems, and digital versatile disk (DVD) drives.

Coded instructions 432 corresponding to the instructions of FIG. 3 may be stored in the mass storage device 428, in the volatile memory 414, in the non-volatile memory 416, in the local memory 413 and/or on a removable tangible computer readable storage medium, such as a CD or DVD 436.

From the foregoing, it will be appreciated that example methods, apparatus and articles of manufacture have been disclosed that improve the operating efficiency of computing devices by predicting the quality of RPD tuning data and removing illogical or missing RPD tuning data from subsequent processing. Further, examples disclosed herein determine an onboarding status of an RPD provider, which results in the elimination of low quality data, thereby conserving memory, reducing processing overhead, etc. Such disclosed examples increase the computational efficiency of computing systems that determine audience measurement statistics from RPD tuning data. In some examples disclosed herein, illogical tuning data is removed from processing, which further reduces the storage requirements of an example computer system. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system to predict return path data quality, the audience measurement computing system comprising:
    media metering devices installed at panelist households statistically-selected and recruited by an audience measurement entity, the media metering devices programmed by the audience measurement entity to monitor media played in the panelist households and automatically report meter tuning data to a network-connected server of the audience measurement computing system via respective network interfaces of the media metering devices, wherein the panelist households are return path data subscribers, wherein the media metering devices monitor media played from first return path devices and first non-return path devices at the panelist households and capture, as part of the meter tuning data, a total number of minutes for the media that was monitored for the panelist households, wherein the first return path devices include first set-top boxes (STBs) connected to or integrated with televisions of the panelist households, wherein non-panelist households that are return path data subscribers include second return path devices and second non-return path devices, and wherein the second return path devices include second STBs connected to or integrated with televisions of the non-panelist households;
    the network-connected server, comprising:
        a network interface;
        at least one memory storing computer readable instructions; and
        at least one processor to execute the computer readable instructions to perform operations comprising:
            automatically obtaining, via the network interface, the meter tuning data from the media metering devices;
            obtaining, via the network interface, from the first STBs, first return path tuning data included in first return path data, wherein the first STBs are configured to collect the first return path data and report the first return path data to the network-connected server, the first return path data comprising tuning events and commands detected by the first STBs, the tuning events comprising a channel change and a start of a media presentation, and the commands comprising a power on command and a power off command, wherein the first return path devices capture, as part of the first return path tuning data, a total number of return path device tuning data minutes for the panelist households;
            obtaining, via the network interface, from the second STBs, second return path tuning data included in second return path data, wherein the second STBs are configured to collect the second return path data and report the second return path data to the network-connected server; 'comparing the minutes of the meter tuning data captured by the media metering devices and the minutes of the first return path tuning data captured by the first return path devices of the panelist households to determine missing data rates indicative of a quantity of the meter tuning data from the panelist households that is not included in the corresponding first return path tuning data of the panelist households;
            computing a first data set of model features from validation tuning data reported from the media metering devices, the validation tuning data comprising return path tuning data from the first return path tuning data for which the network-connected server determined a missing data rate, the first data set of first model features being predictive of return path data that is missing from the non-panelist households;
            computing a second data set of model features from the second return path tuning data;
            based on the first data set, training a machine learning model to, for each of the non-panelist households and relative to a particular period of time, (i) predict a quality indicator of a particular return path data reported from the second STBs of that non-panelist household for the particular period of time and (ii) determine, based on the predicted quality indicator, whether to remove the particular return path tuning data from further processing for the particular period of time, wherein the machine learning model comprises a neural network;
            applying the trained machine learning model to the second data set to, for each of the non-panelist households and relative to the particular period of time, (i) predict the quality indicator of the second return path data for the particular period of time and (ii) determine, based on the predicted quality indicator, whether to remove the second return path tuning data from further processing for the particular period of time, wherein determining, based on the predicted quality indicator, whether to remove the second return path tuning data from further processing for the particular period of time comprises determining that the second return path tuning data should be removed from further processing for the particular period of time; and
            based on the determination that the second return path tuning data should be removed from further processing for the particular period of time, generating ratings for a media presentation without processing the second return path tuning data, the ratings corresponding to the particular period of time.

2. The audience measurement computing system of claim 1, the operations further comprising:
    before applying the trained machine learning model, splitting a training data set using cross validation with numTrees and maxDepth parameters, the numTrees parameter representing a number of decision trees in a random forest classifier of the machine learning model, and the maxDepth parameter representing a maximum number of levels in each decision tree in the random forest classifier.

3. The audience measurement computing system of claim 1, wherein training the machine learning model comprises training a random forest machine learning model with a k-fold cross validation.

4. The audience measurement computing system of claim 1, wherein the operations are performed daily, and wherein the particular period of time is a particular day.

5. The audience measurement computing system of claim 1, the operations further comprising:
determining an onboarding status for a return path data provider that is to provide media to be accessed by the second STBs, the onboarding status based on the predicted quality indicator of the second return path data.

6. The audience measurement computing system of claim 1, the operations further comprising:
filtering a portion of the meter tuning data, a portion of the first return path tuning data, and a portion of the second return path tuning data that are not associated with a first viewing period.

7. A non-transitory computer readable medium comprising instructions that, when executed, cause a processor to perform operations comprising:
automatically obtaining, via a network interface of a network-connected server, meter tuning data from media metering devices, the media metering devices installed at panelist households statistically-selected and recruited by an audience measurement entity, the media metering devices programmed by the audience measurement entity to monitor media played in the panelist households and automatically report the meter tuning data to the network-connected server of the audience measurement computing system via respective network interfaces of the media metering devices, wherein the panelist households are return path data subscribers, wherein the media metering devices monitor media played from first return path devices and first non-return path devices at the panelist households and capture, as part of the meter tuning data, a total number of minutes for the media that was monitored for the panelist households, wherein the first return path devices include first set-top boxes (STBs) connected to or integrated with televisions of the panelist households, wherein non-panelist households that are return path data subscribers include second return path devices and second non-return path devices, and wherein the second return path devices include second STBs connected to or integrated with televisions of the non-panelist households;
obtaining, via the network interface, from the first STBs, first return path tuning data included in first return path data, wherein the first STBs are configured to collect the first return path data and report the first return path data to the network-connected server, the first return path data comprising tuning events and commands detected by the first STBs, the tuning events comprising a channel change and a start of a media presentation, and the commands comprising a power on command and a power off command, wherein the first return path devices capture, as part of the first return path tuning data, a total number of return path device tuning data minutes for the panelist households;
obtaining, via the network interface, from the second STBs, second return path tuning data included in second return path data, wherein the second STBs are configured to collect the second return path data and report the second return path data to the network-connected server;
comparing the minutes of the meter tuning data captured by the media metering devices and the minutes of the first return path tuning data captured by the first return path devices of the panelist households to determine missing data rates indicative of a quantity of the meter tuning data from the panelist households that is not included in the corresponding first return path tuning data of the panelist households;
computing a first data set of model features from validation tuning data reported from the media metering devices, the validation tuning data comprising return path tuning data from the first return path tuning data for which the network-connected server determined a missing data rate, the first data set of first model features being predictive of return path data that is missing from the non-panelist households;
computing a second data set of model features from the second return path tuning data;
based on the first data set, training a machine learning model to, for each of the non-panelist households and relative to a particular period of time, (i) predict a quality indicator of a particular return path data reported from the second STBs of that non- panelist household for the particular period of time and (ii) determine, based on the predicted quality indicator, whether to remove the particular return path tuning data from further processing for the particular period of time, wherein the machine learning model comprises a neural network;
applying the trained machine learning model to the second data set to, for each of the non-panelist households and relative to the particular period of time, (i) predict the quality indicator of the second return path data for the particular period of time and (ii) determine, based on the predicted quality indicator, whether to remove the second return path tuning data from further processing for the particular period of time, wherein determining, based on the predicted quality indicator, whether to remove the second return path tuning data from further processing for the particular period of time comprises determining that the second return path tuning data should be removed from further processing for the particular period of time; and
based on the determination that the second return path tuning data should be removed from further processing for the particular period of time, generating ratings for a media presentation without processing the second return path tuning data, the ratings corresponding to the particular period of time.

8. The non-transitory computer readable medium of claim 7, the operations further comprising:
before applying the trained machine learning model, splitting a training data set using cross validation with numTrees and maxDepth parameters, the numTrees parameter representing a number of decision trees in a random forest classifier of the machine learning model, and the maxDepth parameter representing a maximum number of levels in each decision tree in the random forest classifier.

9. The non-transitory computer readable medium of claim 7, wherein training the machine learning model comprises training a random forest machine learning model with a k-fold cross validation.

10. The non-transitory computer readable medium of claim 7, wherein the operations are performed daily, and wherein the particular period of time is a particular day.

11. The non-transitory computer readable medium of claim 7, the operations further comprising:
determining an onboarding status for a return path data provider that is to provide media to be accessed by the second STBs, the onboarding status based on the predicted quality indicator of the second return path data.

12. The non-transitory computer readable medium of claim 7, the operations further comprising:
filtering a portion of the meter tuning data, a portion of the first return path tuning data, and a portion of the second return path tuning data that are not associated with a first viewing period.

13. A method comprising:
Automatically obtaining, via a network interface of a network-connected server, meter tuning data from media metering devices, the media metering devices installed at panelist households statistically-selected and recruited by an audience measurement entity, the media metering devices programmed by the audience measurement entity to monitor media played in the panelist households and automatically report the meter tuning data to the network-connected server of the audience measurement computing system via respective network interfaces of the media metering devices, wherein the panelist households are return path data subscribers, wherein the media metering devices monitor media played from first return path devices and first non-return path devices at the panelist households and capture, as part of the meter tuning data, a total number of minutes for the media that was monitored for the panelist households, wherein the first return path devices include first set-top boxes (STBs) connected to or integrated with televisions of the panelist households, wherein non-panelist households that are return path data subscribers include second return path devices and second non-return path devices, and wherein the second return path devices include second STBs connected to or integrated with televisions of the non-panelist households;
obtaining, via the network interface, from the first STBs, first return path tuning data included in first return path data, wherein the first STBs are configured to collect the first return path data and report the first return path data to the network-connected server, the first return path data comprising tuning events and commands detected by the first STBs, the tuning events comprising a channel change and a start of a media presentation, and the commands comprising a power on command and a power off command, wherein the first return path devices capture, as part of the first return path tuning data, a total number of return path device tuning data minutes for the panelist households;
obtaining, via the network interface, from the second STBs, second return path tuning data included in second return path data, wherein the second STBs are configured to collect the second return path data and report the second return path data to the network-connected server;
comparing the minutes of the meter tuning data captured by the media metering devices and the minutes of the first return path tuning data captured by the first return path devices of the panelist households to determine missing data rates indicative of a quantity of the meter tuning data from the panelist households that is not included in the corresponding first return path tuning data of the panelist households;
computing a first data set of model features from validation tuning data reported from the media metering devices, the validation tuning data comprising return path tuning data from the first return path tuning data for which the network-connected server determined a missing data rate, the first data set of first model features being predictive of return path data that is missing from the non-panelist households;
computing a second data set of model features from the second return path tuning data;
based on the first data set, training a machine learning model to, for each of the non-panelist households and relative to a particular period of time, (i) predict a quality indicator of a particular return path data reported from the second STBs of that non-panelist household for the particular period of time and (ii) determine, based on the predicted quality indicator, whether to remove the particular return path tuning data from further processing for the particular period of time, wherein the machine learning model comprises a neural network;
applying the trained machine learning model to the second data set to, for each of the non-panelist households and relative to the particular period of time, (i) predict the quality indicator of the second return path data for the particular period of time and (ii) determine, based on the predicted quality indicator, whether to remove the second return path tuning data from further processing for the particular period of time, wherein determining, based on the predicted quality indicator, whether to remove the second return path tuning data from further processing for the particular period of time comprises determining that the second return path tuning data should be removed from further processing for the particular period of time; and
based on the determination that the second return path tuning data should be removed from further processing for the particular period of time, generating ratings for a media presentation without processing the second return path tuning data, the ratings corresponding to the particular period of time.

14. The method of claim 13, further comprising:
before applying the trained machine learning model, splitting a training data set using cross validation with numTrees and maxDepth parameters, the numTrees parameter representing a number of decision trees in a random forest classifier of the machine learning model, and the maxDepth parameter representing a maximum number of levels in each decision tree in the random forest classifier.

15. The method of claim 13, wherein training the machine learning model comprises training a random forest machine learning model with a k-fold cross validation.

16. The method of claim 13, wherein the method is performed daily, and wherein the particular period of time is a particular day.

17. The method of claim 13, further comprising:
determining an onboarding status for a return path data provider that is to provide media to be accessed by the second STBs, the onboarding status based on the predicted quality indicator of the second return path data.

18. The method of claim 13, further comprising:
filtering a portion of the meter tuning data, a portion of the first return path tuning data, and a portion of the second return path tuning data that are not associated with a first viewing period.

\* \* \* \* \*